United States Patent
Kushler

(10) Patent No.: US 9,348,512 B2
(45) Date of Patent: May 24, 2016

(54) METHODS FOR FACILITATING TEXT ENTRY

(75) Inventor: Clifford A. Kushler, Nevada City, CA (US)

(73) Assignee: Nuance Communications, Inc., Burlington, MA (US)

(*) Notice: Subject to any disclaimer, the term of this patent is extended or adjusted under 35 U.S.C. 154(b) by 614 days.

(21) Appl. No.: 13/569,694

(22) Filed: Aug. 8, 2012

(65) Prior Publication Data

US 2014/0047394 A1  Feb. 13, 2014

(51) Int. Cl.
*G06F 3/0481* (2013.01)
*G06F 3/0488* (2013.01)

(52) U.S. Cl.
CPC ........ *G06F 3/04886* (2013.01); *G06F 3/04812* (2013.01)

(58) Field of Classification Search
None
See application file for complete search history.

(56) References Cited

U.S. PATENT DOCUMENTS

| | | | | |
|---|---|---|---|---|
| 4,370,645 A * | 1/1983 | Cason et al. | | 345/157 |
| 4,495,490 A * | 1/1985 | Hopper et al. | | 345/469 |
| 4,692,858 A * | 9/1987 | Redford et al. | | 715/744 |
| 4,806,916 A * | 2/1989 | Raskin et al. | | 345/157 |
| 5,019,806 A * | 5/1991 | Raskin et al. | | 345/160 |
| 5,084,820 A * | 1/1992 | Nagaya et al. | | 715/210 |
| 5,201,033 A * | 4/1993 | Eagen et al. | | 715/754 |
| 5,285,526 A * | 2/1994 | Bennett et al. | | 715/234 |
| 5,506,951 A * | 4/1996 | Ishikawa | | 715/786 |
| 5,598,183 A * | 1/1997 | Robertson et al. | | 715/856 |
| 5,659,747 A * | 8/1997 | Nakajima | | 713/1 |
| 5,680,605 A * | 10/1997 | Torres | | |
| 5,867,144 A * | 2/1999 | Wyard | | 715/769 |
| 5,877,757 A * | 3/1999 | Baldwin et al. | | 715/705 |
| 5,960,411 A | 9/1999 | Hartman et al. | | |
| 6,243,722 B1 * | 6/2001 | Day et al. | | 715/205 |
| 6,292,172 B1 * | 9/2001 | Makhlouf | | 345/157 |
| 6,356,866 B1 * | 3/2002 | Pratley et al. | | 704/9 |
| 6,360,237 B1 * | 3/2002 | Schulz et al. | | 715/255 |
| 6,587,132 B1 | 7/2003 | Smethers | | |
| 6,791,587 B1 * | 9/2004 | Bamford et al. | | 715/854 |
| 7,003,695 B2 * | 2/2006 | Li | | 714/19 |
| 7,073,138 B2 * | 7/2006 | Mirkin | | 715/857 |
| 7,542,029 B2 | 6/2009 | Kushler | | |
| 7,992,085 B2 * | 8/2011 | Wang-Aryattanwanich et al. | | 715/711 |

(Continued)

OTHER PUBLICATIONS

Simpson, Alan, Mastering WordPerfect 5.1 & 5.2 for Windows, 1993, SYBEX Inc., pp. 8, 179-182, 350-352, and 1068-1073.*

(Continued)

*Primary Examiner* — Ryan Barrett
(74) *Attorney, Agent, or Firm* — Perkins Coie LLP

(57) ABSTRACT

A system and method controlling the location of a text insertion cursor that marks a location where content is to be added to a content accumulator. The system automatically maintains one or more active cursor locations that mark where content has been sequentially added at one or more different positions in the content accumulator. The system receives a command to move the insertion cursor to a location of a previously created active cursor location. In one embodiment, active cursor locations are stored in a list and the insertion cursor can be moved to each active cursor location in the list. Therefore, if the user enters content in the content accumulator non-sequentially, the method may maintain one active cursor following each sequentially entered text string. Upon receiving an active cursor recalling command from the user, the method recalls an active cursor by relocating the content insertion cursor to the active cursor.

20 Claims, 12 Drawing Sheets

(56) References Cited

U.S. PATENT DOCUMENTS

| | | | | |
|---|---|---|---|---|
| 8,230,366 | B2* | 7/2012 | Chaudhri | 715/859 |
| 8,276,099 | B2* | 9/2012 | Yost | 715/856 |
| 2002/0095291 | A1* | 7/2002 | Sumner | 704/270 |
| 2003/0074416 | A1* | 4/2003 | Bates et al. | 709/217 |
| 2004/0006763 | A1* | 1/2004 | Van De Vanter et al. | 717/110 |
| 2004/0217944 | A1* | 11/2004 | Kong | 345/173 |
| 2005/0132297 | A1* | 6/2005 | Milic-Frayling et al. | 715/745 |
| 2006/0075357 | A1* | 4/2006 | Guido et al. | 715/784 |
| 2006/0129884 | A1* | 6/2006 | Clark | 714/15 |
| 2006/0143571 | A1* | 6/2006 | Chan | 715/764 |
| 2007/0130517 | A1* | 6/2007 | Wu | 715/530 |
| 2008/0082922 | A1* | 4/2008 | Biniak et al. | 715/719 |
| 2008/0109831 | A1* | 5/2008 | Lee | 719/329 |
| 2008/0134033 | A1* | 6/2008 | Burns et al. | 715/705 |
| 2008/0172607 | A1* | 7/2008 | Baer | 715/255 |
| 2008/0195979 | A1* | 8/2008 | Souza et al. | 715/856 |
| 2008/0222552 | A1* | 9/2008 | Batarseh et al. | 715/776 |
| 2008/0316212 | A1* | 12/2008 | Kushler | 345/467 |
| 2009/0083678 | A1* | 3/2009 | Fitzmaurice et al. | 715/858 |
| 2009/0288043 | A1* | 11/2009 | Willis | 715/859 |
| 2010/0169766 | A1* | 7/2010 | Duarte et al. | 715/244 |
| 2010/0306665 | A1* | 12/2010 | Milic-Frayling et al. | 715/738 |
| 2011/0107246 | A1* | 5/2011 | Vik | 715/771 |
| 2011/0239150 | A1 | 9/2011 | Liao | |
| 2011/0239153 | A1 | 9/2011 | Carter et al. | |
| 2012/0084644 | A1* | 4/2012 | Robert et al. | 715/255 |
| 2012/0113001 | A1* | 5/2012 | Yamauchi et al. | 345/157 |
| 2012/0210220 | A1* | 8/2012 | Pendergast et al. | 715/716 |
| 2012/0317522 | A1* | 12/2012 | Duarte et al. | 715/863 |
| 2013/0069881 | A1* | 3/2013 | Pasquero et al. | 345/169 |
| 2013/0227401 | A1* | 8/2013 | Kandekar et al. | 715/254 |
| 2013/0241832 | A1* | 9/2013 | Rimon et al. | 345/158 |

OTHER PUBLICATIONS

"Vim documentation: motion," May 14, 2010, http://vimdoc.sourceforge.net/htmldoc/motion.html.*

SlickEdit, 2007, http://www.slickedit.com/images/stories/product_documentation/SlickEdit/slickedit_userguide_1202.pdf.*

International Search Report and Written Opinion in International Application No. PCT/US2013/054204, mailing date Nov. 28, 2013, 10 pages.

* cited by examiner

METHODS FOR FACILITATING TEXT ENTRY

BACKGROUND

Modern mobile phones and other electronic devices commonly utilize textual recognition algorithms that allow a user to enter text at high rates of speed on a variety of user input hardware. However, ambiguous user inputs can result in improperly recognized textual elements, which may require tedious or interruptive correction procedures.

For example, a smart phone or other device may utilize a touch-screen (hereinafter "touchscreen") device to display a keyboard on the screen and receive swipe, tap, or other touch-based user input gestures on the displayed keyboard, from which words and other textual elements may be recognized. At times, the smart phone may recognize an erroneous textual element from a user input gesture. If the user sees a recognition error in the last-recognized textual element, the user may be able to correct the error by tapping on a menu item presented within a list of alternately recognizable textual elements. However, this procedure may interrupt the user's train of thought for entering additional text. Such interruptions are counter-productive for entering text at high speeds.

In some systems, such as that described in U.S. Pat. No. 7,542,029, the new text insertion cursor is automatically restored to its previous location following a recognition error correction. However, such systems reduce the user's control over the text insertion cursor location, and are perceived as non-intuitive to new users. Furthermore, independently defining and implementing a gesture to initiate a process to repair a recognition error may be impossible for some third-party software applications to do. For example, a third-party software developer may desire to implement the usage of a long-tap gesture or a double-tap gesture to allow a user to indicate an erroneously recognized textual element. However, the third-party software developer may be unable to easily implement such functionality because some operating systems do not allow overloading other inherent behavior (e.g., the presentment of a "cut/copy/paste" menu) in response to receiving such a gesture directed at one or more textual elements.

Moreover, as a user naturally composes a body of text, such as a document, the composition often does not proceed sequentially. In a natural text composition process, even when the user is not correcting a recognition error, the user may desire to relocate the text insertion cursor in order to input new text non-sequentially. However, indication of the precise location for which relocation of the text insertion cursor is desired on a touchscreen (and other user input devices) can be problematic. For example, if the smart phone user needs to tap with the user's finger on a relatively small touchscreen location that is between two small textual elements in order to relocate the text insertion cursor there, there may be a high probability of the user tapping on an undesired location. Inaccurate or unintended cursor relocation can be particularly frustrating for many users who desire to enter text into their electronic devices.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
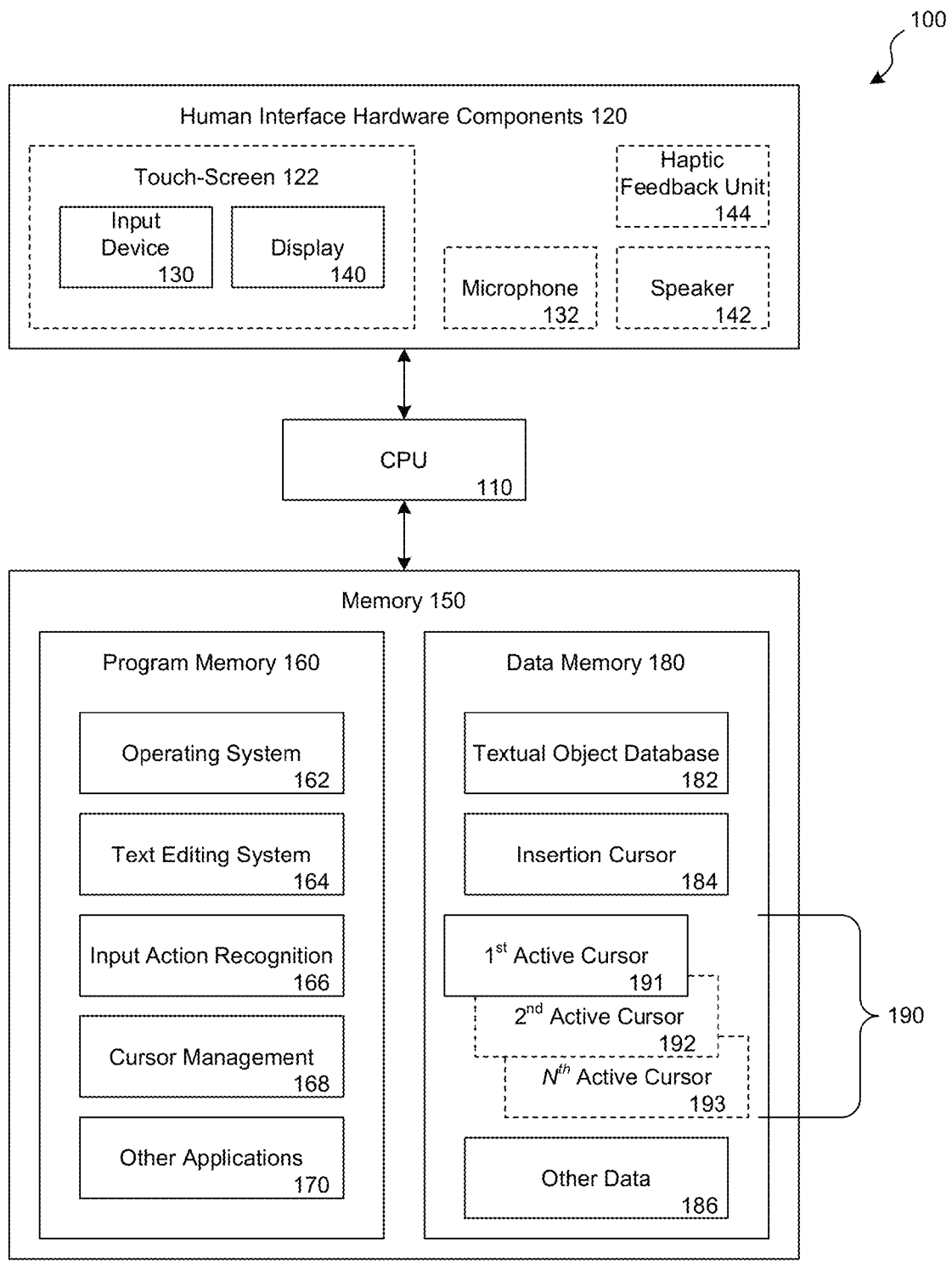
FIG. 1 is a block diagram illustrating a system for facilitating insertion cursor repositioning by maintaining one or more active cursors after non-sequentially entering content or correcting recognition errors.

In one embodiment of the disclosed technology, a method facilitates the repositioning of a content insertion cursor to a different location that is desirable for new content entry, after a user has non-sequentially entered content or corrected errors. The method does this by maintaining at least one "active cursor" representing a location at which one or more textual objects have been sequentially entered. Note that here the term "active cursor" refers to a recorded location within a document or text field. An active cursor may coincide with the current content insertion location, in which case it is simply displayed as the normal content insertion cursor, typically as a flashing vertical line. Other active cursors are typically not displayed in the text display, but in some embodiments they may be indicated visually to facilitate the user's management of active cursors, in particular the ability to delete active cursors that are no longer useful to the user. Therefore, if the user enters textual objects non-sequentially, the method may maintain multiple active cursors, one following each sequentially entered text string. Upon receiving an active cursor recalling command from the user, the method recalls an active cursor by relocating the content insertion cursor to the location of an active cursor.

In another embodiment of the disclosed technology, a text inputting and editing system may utilize the method for repositioning a content insertion cursor.

In other embodiments of the disclosed technology, one or more non-transitory computer readable storage media store data structures that allow a system to save its state (e.g., maintaining the one or more active cursors), or may store computer executable instructions that implement the method or, implement an aspect of the system. The computer-readable storage media may include removable media (e.g., a floppy disk, a removable flash drive, a magnetic tape, CD-ROM, DVD, or other optical disc, etc.), or fixed media (e.g., a hard disk, etc.) and so on.

Various embodiments of the disclosed technology will now be described with reference to the figures. The following description provides specific details for a thorough understanding and enabling description of these embodiments. One skilled in the art will understand, however, that the disclosed technology may be practiced without many of these details. Additionally, some well-known structures or functions may not be shown or described in detail, so as to avoid unnecessarily obscuring the relevant description of the various embodiments.

The terminology used in the description presented herein is intended to be interpreted in its broadest reasonable manner, even though it is being used in conjunction with a detailed description of certain specific embodiments. Certain terms may even be emphasized herein; however, any terminology intended to be interpreted in any restricted manner will be overtly and specifically defined as such in this Detailed Description section.

One Embodiment of the Disclosed System

FIG. 1 is a block diagram illustrating a system 100 for facilitating insertion cursor repositioning. The system 100 includes a CPU 110 (central processing unit, or processor). The CPU 110 is coupled to one or more human interface hardware components 120, as well as to a memory 150. The human interface hardware components 120 include an input device 130, which provides input to the CPU 110 of actions performed by a user. A hardware controller may interpret the raw signals received from the input device 130. In some embodiments, a microphone 132 may function as the input device 130, or may provide supplementary input to the CPU 110. The microphone 132 may receive spoken input from the user, such as for an input action recognition component 166 implementing speech recognition. In some embodiments, a touchscreen display 122 is an input device 130, and notifies the CPU 110 of contact events when the touchscreen is touched by a user.

Similarly, the CPU 110 communicates with a hardware controller for a display 140. One example of the display 140 is the touchscreen 122, which includes a display that provides graphical and textual, visual feedback to the user. Optionally, a speaker 142 may be used to pass on any appropriate auditory signals to the user as guidance (e.g., for error signals, reading of the displayed text or menu options, etc.). Optionally, a haptic feedback unit 144 may also be used to provide tactile, vibratory signals to the user (similarly, to convey error signals, confirm selection actions, etc.).

The CPU 110 has access to a memory 150, which may include a combination of temporary and/or permanent storage, and both readable and writable memory (random access memory or RAM), read only memory (ROM), writable non-volatile memory, such as flash memory, hard drives, and so forth. The memory 150 includes program memory 160 that contains all programs and software (including components, libraries, subroutines, modules, and so on) such as an operating system 162, a text editing system component 164, an input action recognition component 166, a cursor management component 168, and any other application program 170.

As will be described in greater detail below, the text editing system component 164 utilizes the cursor management component 168 in order to record and restore one or more locations of text insertion positions (hereinafter "active cursors") according to an embodiment of the disclosed technology.

The memory 150 also includes data memory 180. The data memory 180 includes a textual object database 182, which contains textual objects that are recognizable by the input action recognition component 166 (i.e., it contains a dictionary of recognizable textual objects, such as words.) The data memory 180 also contains a location of an insertion cursor 184, which is maintained by the cursor management component 168. The insertion cursor 184 is additionally utilized by the text editing system 164 to determine where new textual objects are to be inserted (e.g., at what location in a text accumulator). The data memory 180 also stores a location of one or more active cursors 190, and other data 186.

Examples of the other data 186 include buffers or accumulators. The buffers or accumulators may be used by the text editing system 164 to accumulate textual elements, or other content, such as multimedia attachments that the user may insert into a composition. A screen buffer may periodically be read by the display 140 in order to refresh the display 140. An input buffer may be used to store a received sequence of user input actions such as gestures performed on the touchscreen 122 and/or utterances detected by the microphone 132. Buffers may also store a list of recognized textual elements for each textual input gesture, and so on.

As will be explained in detail below, the cursor management component 168 maintains the one or more active cursors 190, by, for example, creating them, updating them, and deleting them automatically in response to user input actions. Upon recognition of an active cursor recalling command by the input action recognition component 166, the location of the insertion cursor 184 is moved to the location of one of the active cursors 190. The location of the recalled active cursor is utilized by the text editing system 164 to manage the location of subsequently inserted textual elements.

Figure 2A:
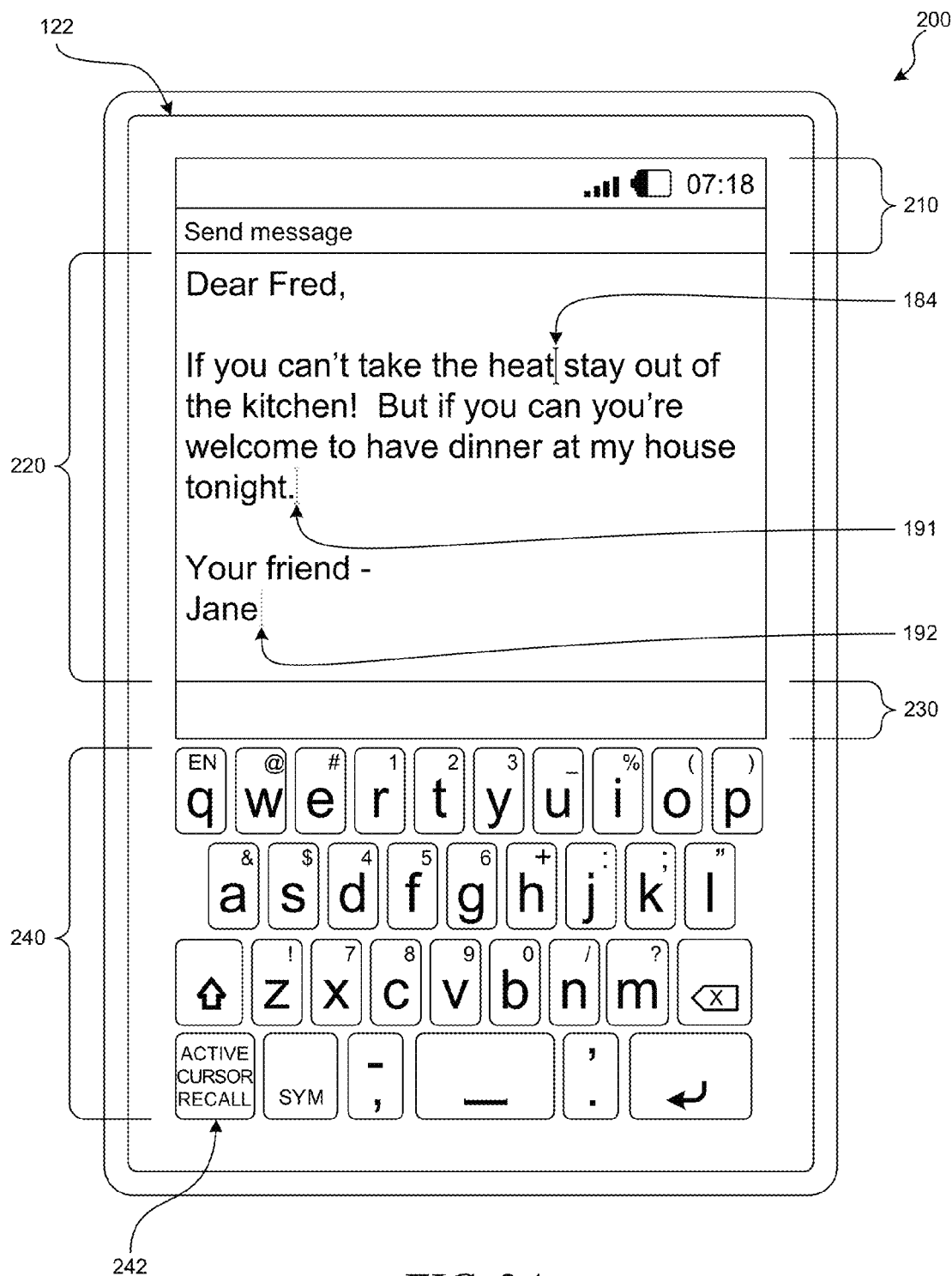
FIG. 2A illustrates an example touchscreen user interface of a smart phone implementing the system of FIG. 1, which is ready to recall either of two different active cursors.

FIG. 2A illustrates an example user interface displayed on a smart phone or other electronic device, which is ready to recall either of two different active cursors 191 and 192. Note that FIG. 2A shows a vertical line displayed at active cursor locations 191 and 192 to help make the illustration easier to follow, but in many embodiments no visible indication is displayed at the location of active cursors other than at the current content insertion location. The touchscreen 122 contains various display areas, including a title bar area 210, a text accumulation area 220, a menu area 230 that is used for correcting recognition errors, and a keyboard area 240. The title bar area 210 may display the time, battery life, wireless signal strength, or other status information relating to a smart phone 200. The title bar area 210 may also display the title of the currently active application (e.g., one of the applications 170 that the smart phone 200 is running), or the currently active function of the operating system 162. In the example shown in the figure, the title bar area 210 indicates that the mobile phone is in a message sending application (e.g., for sending a text message, instant message, e-mail, etc.). Also, the contents of the text accumulation area 220 that are shown in FIG. 2A include two active cursors 191 and 192 that are created by entering text at different locations in the text accumulation area 220.

The message sending application utilizes the text editing system 164 in order to receive the textual contents of a message in the text accumulation area 220. The next entered textual element that the input action recognition component 166 recognizes will be inserted into the text accumulation area 220 at the insertion cursor 184. When ready to receive text from the user (as is shown in FIG. 2), the text editing system 164 displays the text accumulation area 220, the menu area 230, as well as the keyboard area 240 on the touchscreen 122. An active cursor recall key 242 is usable under certain circumstances, which will be further detailed below, to facilitate control of the location of the insertion cursor 184.

Figure 2B:
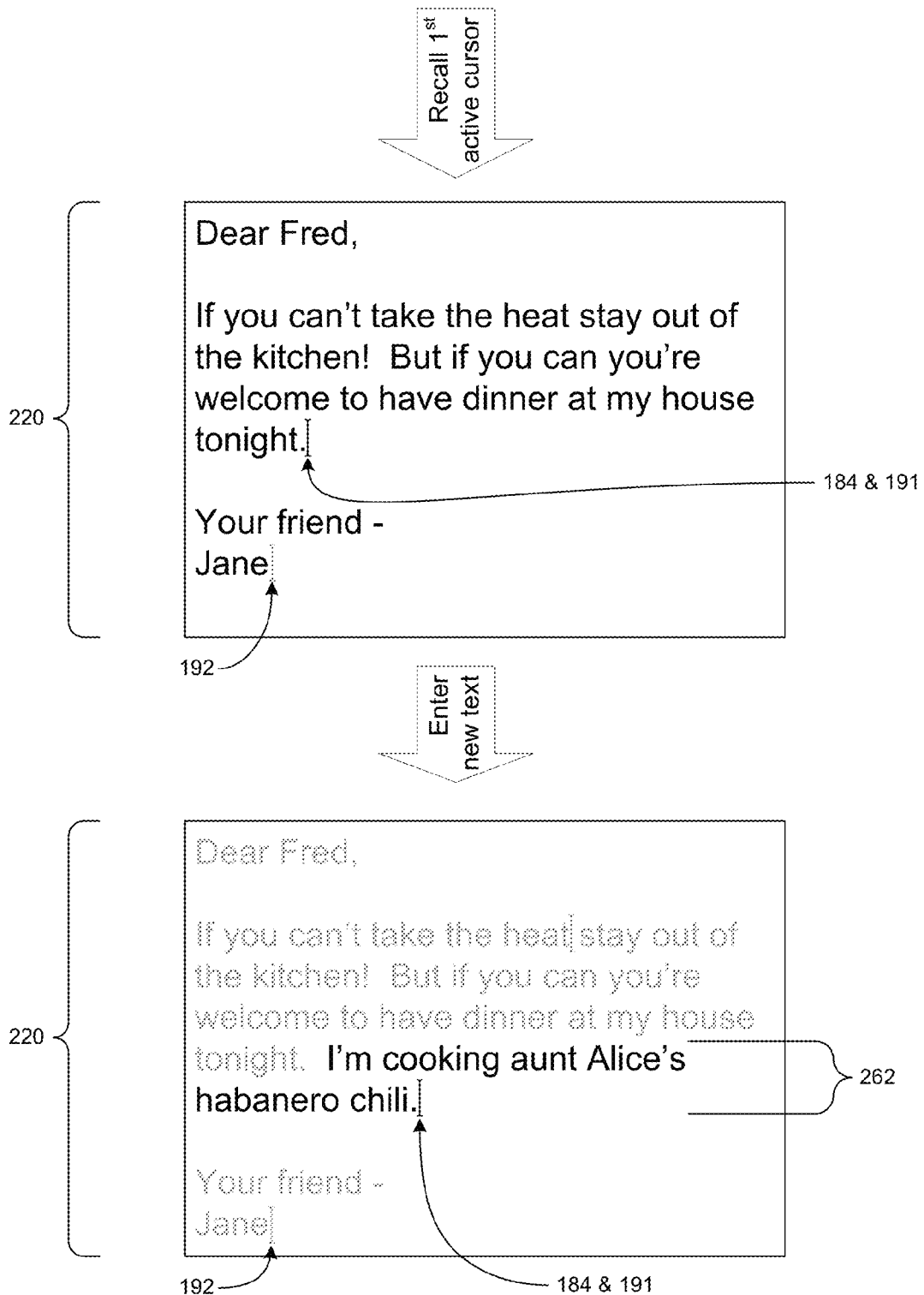
FIG. 2B illustrates the touchscreen user interface shown in FIG. 2A recalling a first active cursor, and subsequently inserting new text at that location.

FIG. 2B illustrates the user interface screen of FIG. 2A recalling the first active cursor 191, and subsequently inserting new text 262 at that location. Once text is entered, the text insertion cursor 184 and active cursor location 191 are advanced as the new text is entered. Note that the newly inserted text 262 also results in advancing active cursor location 192, which follows inserted text 262 and is also advanced according to the length of inserted text 262 so that it continues to refer to the location immediately following the sequentially entered text ending with the word "Jane".

Figure 3:
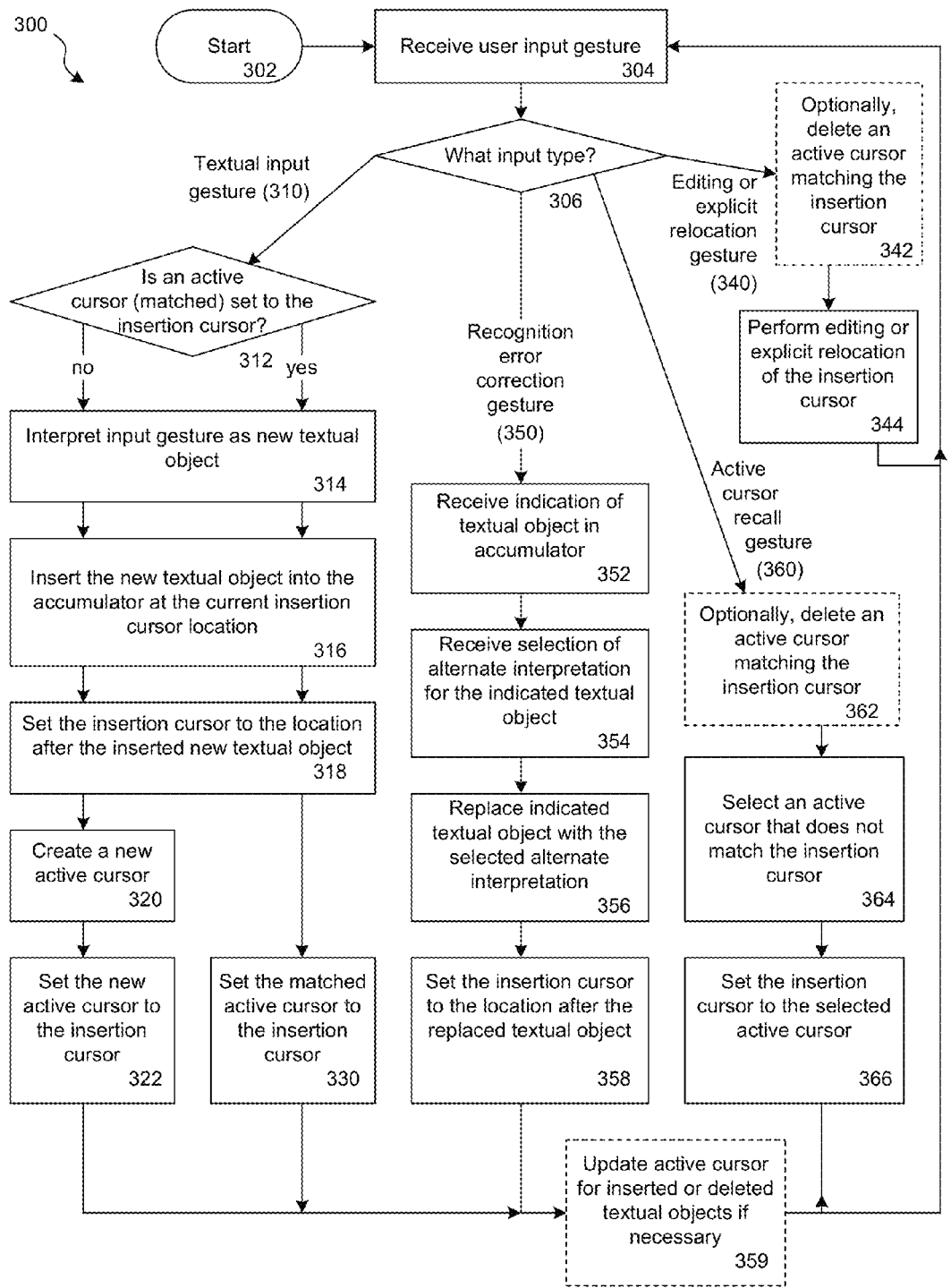
FIG. 3 is a flow diagram of a routine for repositioning a cursor to a location desirable for new content entry after non-sequentially entering content or correcting errors in accordance with an embodiment of the disclosed technology.

FIG. 3 is a flow diagram of a routine 300 (also known as a process or method) for repositioning the insertion cursor 184 to a location desirable for new content entry after non-sequentially entering content or correcting errors. The desirable location is one of the active cursors 190. The routine 300 can be employed by the system 100, such as in the example of the smart phone 200. The routine 300 begins at a start block 302. Proceeding to a block 304, the routine 300 is ready to receive user input from the input device 130 (e.g., from the touchscreen 122, and/or from the microphone 132 or from any other input device such as an external keyboard). FIG. 2A provides one example of a user interface screen on the smart phone 200 that is in this state, ready to receive a user input gesture. Once user input has been received in block 304, the routine 300 proceeds to a block 306, where it determines the type of the user input. Types of user inputs include a textural input gesture 310, an editing or explicit relocation gesture 340, a recognition error correction gesture 350, and an active cursor recall gesture 360.

Textual Input Gesture Processing

When the input action recognition component 166 determines that the system 100 has received a textual input gesture 310 (e.g., because the user input gesture was performed over text character keys of the keyboard area 240), the routine proceeds to a block 312. At the block 312, the routine determines if any of the active cursors 190 that may exist are set, (or "matched") to the insertion cursor 184.

Figure 4A:
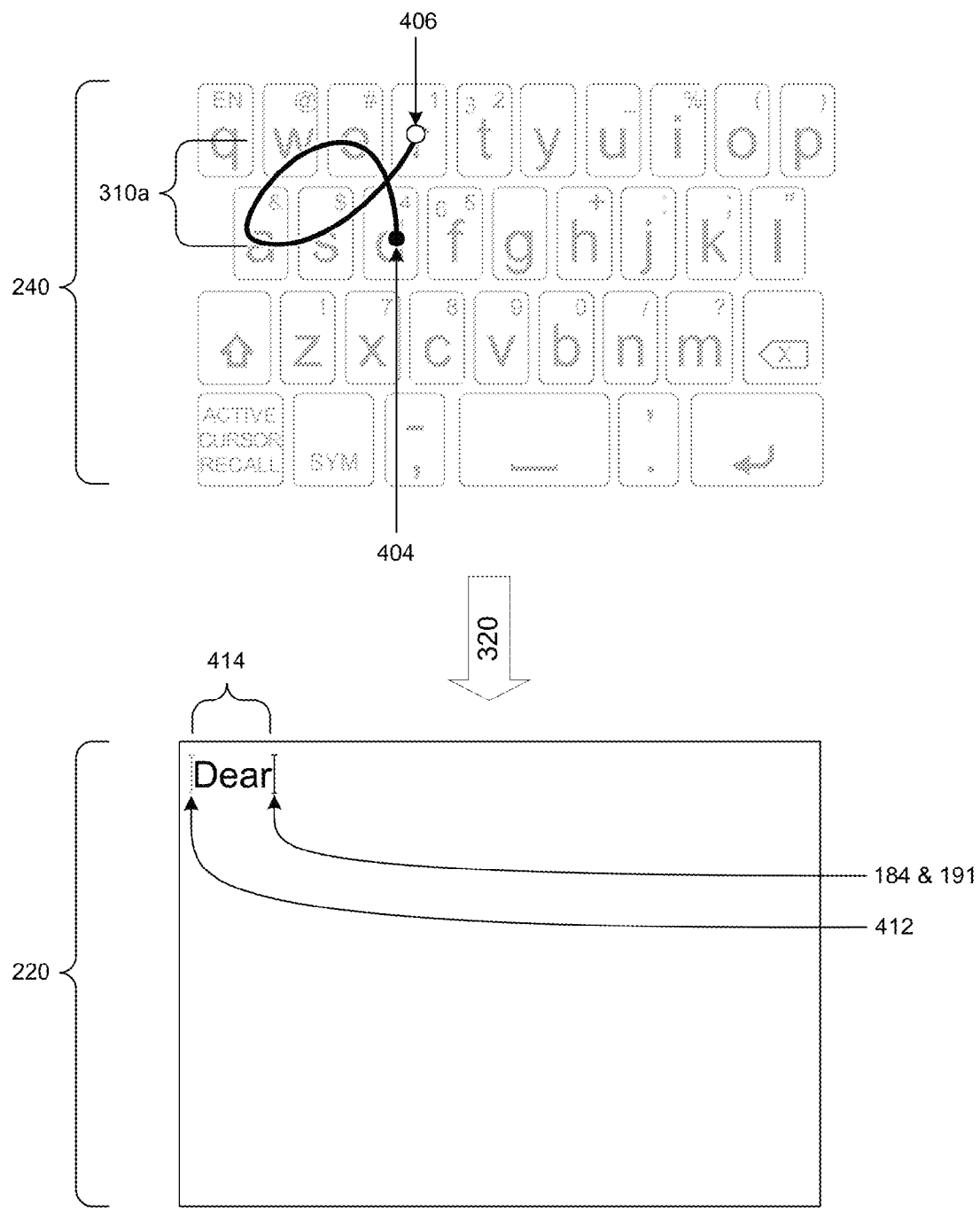
FIG. 4A illustrates the creation of a new active cursor using the routine of FIG. 3, after receiving a textual input gesture.

FIG. 4A illustrates the creation of a new active cursor after receiving a textual input gesture 310. In this example, a textual input gesture 310a represents the word "Dear" 414. The textual input gesture 310a is shown being performed in the keyboard area 240. The gesture 310a starts when the user presses the touchscreen 122 at a location 404, in proximity to the "d" key. In the figures presented herein, a "finger down" event such as at the location 404 is represented by a black circle. The user then drags his finger over the keyboard area 240 with the path that is illustrated by the thick line extending from the location 404 to a location 406. At the location 406, the user lifts his finger off the touchscreen 122. This is illustrated herein by a white dot, such as the white dot at the location 406, which is near the middle of the "r" key. As can be seen, the path 310a starts at the letter "d", passes over the letters "e", and "a", and terminates at the letter "r". This text input gesture is simply illustrative, as the text to be input (in the current example, the word "dear") can also be entered through other text input methods such as speaking the word "dear" into a microphone providing audio input to a speech recognition system, or by tapping a sequence of letters on a touchscreen or external error-correcting keyboard. In the case of an error-correcting keyboard, the processing for a textual input gesture (310) would be carried out following each tapped key.

FIG. 4A also illustrates an insertion of a new corresponding textual object 414 into the text accumulation area 220. After the new text object is inserted, the insertion cursor 184 is moved to a position after the newly inserted text. FIG. 4A also illustrates the associated creation of a new active cursor 191 that occurs using the process of FIG. 3. These events take place after the user performs the textual input gesture 310a. Prior to recognizing the gesture 310a, the insertion cursor 184 is located at an initial location 412, and there are not yet any active cursors 190. Therefore, referring back to FIG. 3, at the block 312, the cursor management component 168 determines that no active cursor matches the insertion cursor. Proceeding to block 314, the routine 300 interprets the textual input gesture as a new textual object. During this interpretation 314, the input action recognition component 166 selects a textual object from the textual object database 182 that it determines has the highest probability of being the text that the user desired to enter. For example, the gesture 310a may be interpreted as the word "Dear", by considering factors such as the proximity of the keys representing the letters of that word to the path of the gesture 310a. Additional details of the interpretation 314 are available in U.S. Pat. No. 7,542,029, entitled "SYSTEM AND METHOD FOR A USER INTERFACE FOR TEXT EDITING AND MENU SELECTION", dated Jun. 2, 2009, the content of which is herein incorporated by reference in its entirety. Other alternative interpretations may be simultaneously identified and saved in a list of alternate interpretations associated with the identified word "Dear" that is inserted as a textual object. Other input methods such as a speech-recognition system or an error-correcting keyboard similarly can identify other alternative word choices such as "deer" or "fear."

Proceeding to block 316, the system 100 inserts the interpreted new textual object 414 into the text accumulation area 220 at the location of the insertion cursor 184. The routine 300 then proceeds to block 318, where the cursor management component 168 sets (i.e., changes, relocates, or moves) the location of the insertion cursor 184 to a new location that is after the newly inserted textual object. For example, in FIG. 4A, the location of the insertion cursor 184 is moved to a new location just after the word "Dear." Herein, certain elements, such as the initial location 412 of the insertion cursor 184, displayed previously to others are indicated in a gray shade in order to emphasize the dynamics of the routine 300.

Because the routine 300 did not match any active cursor to the insertion cursor at step 312, the routine 300 proceeds from the step 318 to a step 320 to create a new active cursor. The routine 300 then proceeds from the block 320 to a block 322, where the newly created active cursor is set to the insertion cursor 184. For example, initially in FIG. 4A, since no active cursor has yet been created, the system 100 creates the 1st active cursor 191 after the newly inserted text and moves the location of the insertion cursor 184 to coincide with the new active cursor 191. After the insertion, deletion or replacement of any text, the routine 300 proceeds to a step 359 to determine whether any existing active cursors are affected by the insertion or deletion of preceding text, and if so, are adjusted accordingly so that they continue to refer to the same relative locations within the existing text. After the completion of the block 359, the routine 300 loops back to the block 304, where it is ready to receive an additional user input.

Figure 4B:
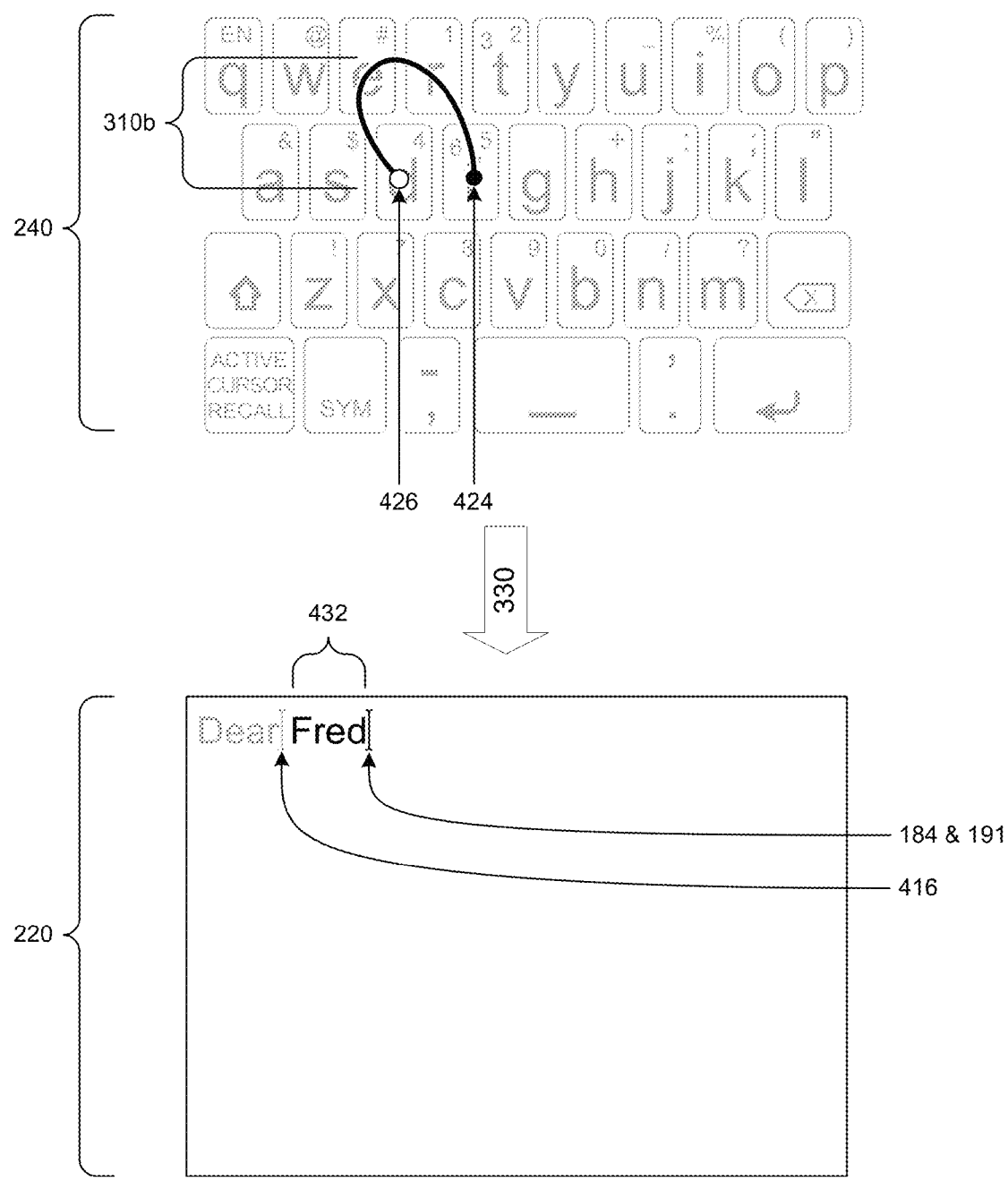
FIG. 4B illustrates the maintenance of an existing active cursor using the routine of FIG. 3, after receiving a textual input gesture.

FIG. 4B illustrates the maintenance of an existing active cursor using the routine of FIG. 3, after receiving a textual input gesture. In this example, a textual input gesture 310b starting at a location 424 and ending at a location 426 is performed subsequently to the acts shown in FIG. 4A. Then, an associated new textual object "Fred" 432 is inserted into the text accumulation area 220, and the location of the insertion cursor and the active cursor are moved to a position after the newly inserted word. When the user performs the gesture 310*b*, the routine 300 determines at the block 312 that one of the active cursors 190 matches the location of the insertion cursor 184. Because the cursor management component 168 identified one of the active cursors 190 as matching the location of the insertion cursor during the block 312, the routine 300 proceeds from the block 318 to a block 330. At the block 330, the cursor management component 168 updates the active cursor that was identified during the block 312 as matching the insertion cursor 184 so that it continues to match the insertion cursor 184 at its new location. For example, in FIG. 4B, the 1st active cursor 191 is set to the repositioned insertion cursor location after the newly inserted word "Fred". In other words, an active cursor that matches the insertion cursor prior to receiving a textual input gesture 310 will be maintained to match the insertion cursor following the insertion of new content into the content accumulator. As described earlier, after the insertion of any text, the routine 300 proceeds to step 359 to determine whether any existing active cursors are affected by the insertion or deletion of preceding text, and if so, are adjusted accordingly so that they continue to refer to the same relative locations within the existing text.

Figure 4C:
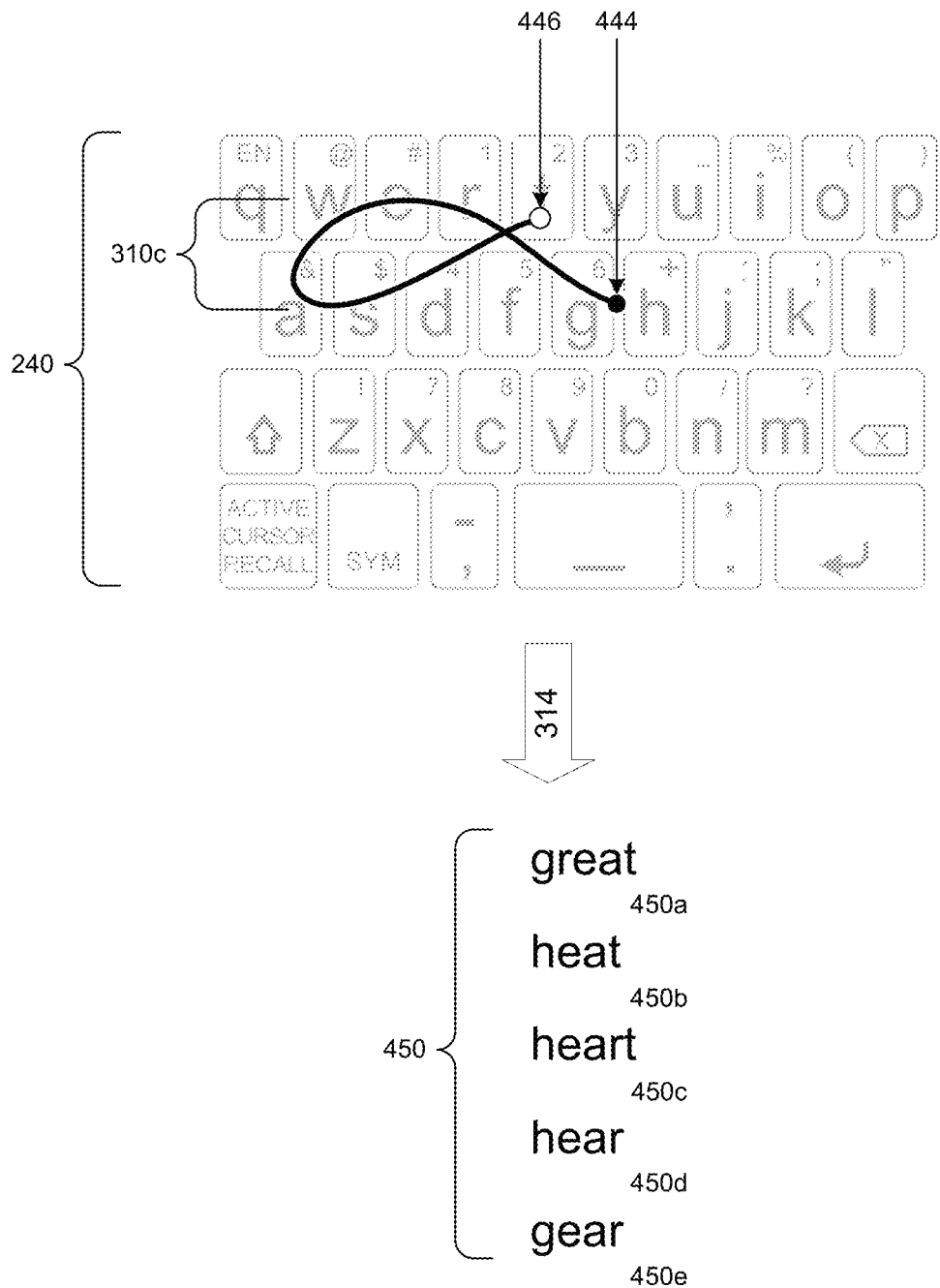
FIG. 4C illustrates an example of an ambiguous textual input gesture, which may result in a recognition error.

FIG. 4C illustrates an example of an ambiguous textual input action (in this example, a textual input gesture 310*c*) which may result in a recognition error. The user may perform the gesture 310*c* over the keyboard area 240, and textual object options 450 that the smart phone 200 may recognize based on the ambiguous gesture are also shown. As with the previous exemplary gestures 310*a* and 310*b*, the gesture 310*c* is a swiping gesture, having a beginning point 444, an end point 446, and a path in between. The options 450 for the ambiguous gesture 310*c* include the words "great" 450*a*, "heat" 450*b*, "heart" 450*c*, "hear" 450*d*, and "gear" 450*e*. As with the textual objects 414 and 432, each of the options 450 is a textual object that is stored in the textual object database 182. At times, the textual object interpreted at the block 312 and inserted at the block 314 may be in error, and may necessitate correction.

Explicit Cursor Relocation Gesture Processing

Figure 5:
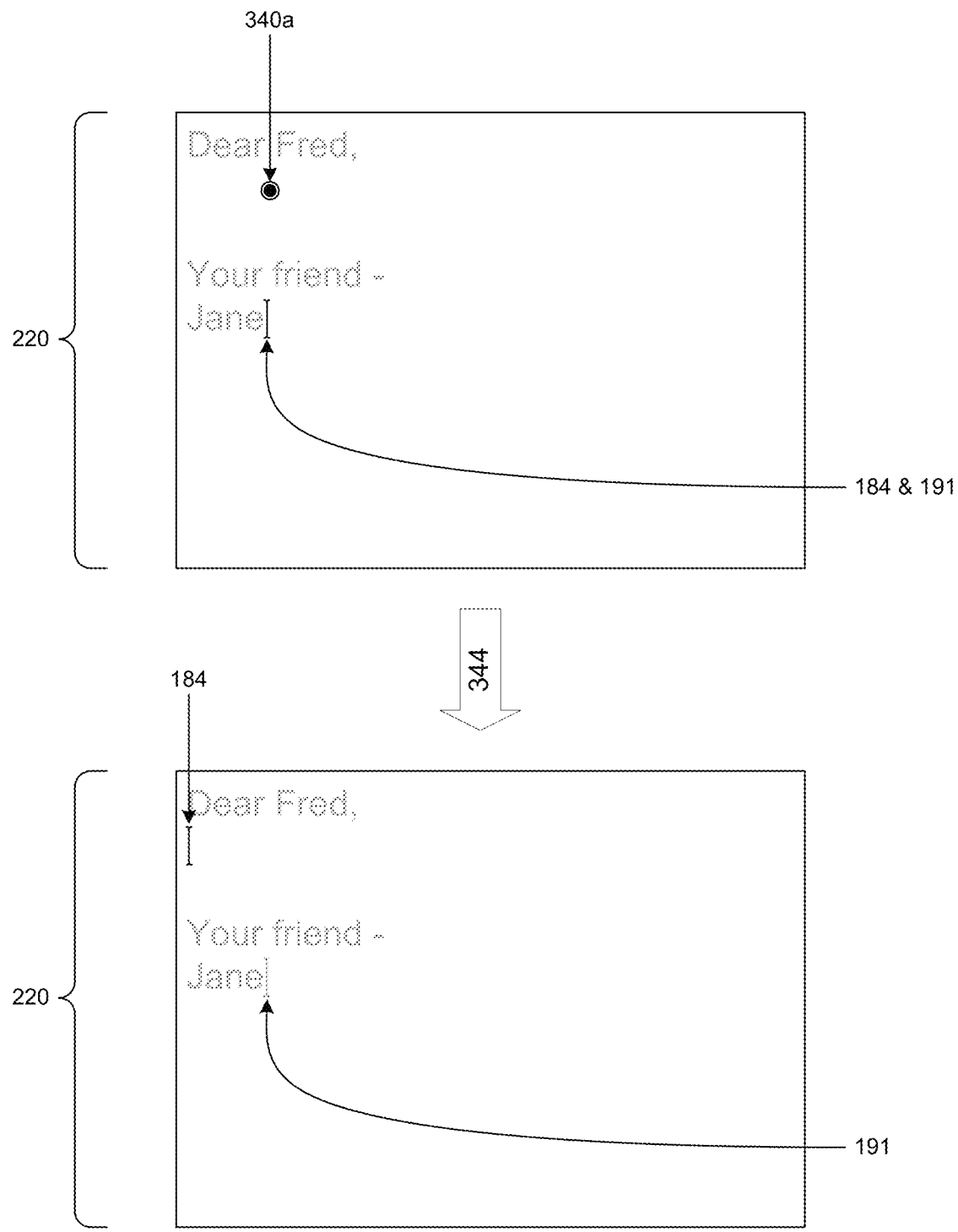
FIG. 5 illustrates a single-tap gesture being used on a smart phone user interface to explicitly relocate the insertion cursor without creating or relocating an active cursor.

FIG. 5 illustrates a single-tap gesture 340*a* being used on the smart phone 200 or other device to explicitly relocate the insertion cursor 184 without creating or relocating an active cursor. Note that the insertion cursor relocation action may consist of any of a variety of user input actions, including gestures on the touchscreen keyboard, gestures on the text display area, spoken commands, etc. The inclusion of a specific function key on the keyboard is one exemplary embodiment used for this example. Before the single-tap gesture 340*a* is performed, both the insertion cursor 182 as well as the 1st active cursor 191 are located at the end of the displayed, sequentially entered textual elements.

Referring back to FIG. 3, when the routine 300 determines at 306 that the user input is an editing gesture or an explicit cursor relocation gesture 340, the routine may proceed to the optional block 342, where an active cursor matching the insertion cursor (e.g., the first active cursor 191) may be deleted. In some embodiments, the deletion is contingent on additional conditions. For example, the deletion may occur only when the user has performed a sequence of at least two cursor relocation gestures in a row. This functionality could provide users with a convenient and intuitive means to delete unwanted active cursors. In some embodiments, a matching active cursor in a plurality 190 of active cursors may be repositioned or sorted within the plurality 190. For example, the routine 300 may move a matching, 1st active cursor 191 to the 2nd position 192 or to the Nth position 193, in order to make the moved active cursor more convenient (or, alternately, less convenient) for the user to subsequently recall.

The routine 300 will then proceed to a block 344 and perform editing or relocation of the insertion cursor 184. An example of an editing command is to change the font size or text characteristic, e.g., to put a word in italics or to make it appear bold. Another example is to delete a textual element or character appearing prior to the insertion cursor 184 (e.g., by pressing a "backspace" key).

An example of explicit relocation of the insertion cursor is shown in FIG. 5. Here a relocation gesture is performed at a point 340*a*, and the insertion cursor 184 is explicitly relocated to the closest position in between textual elements near the location 340*a*. It will be apparent that, if the size of the displayed textual elements is small (such as may be necessary to fit many textual elements in the text accumulation area 220), then the user may experience difficulty with accurately positioning the location of the tap gesture 340*a*. For example, if, due to having a large finger, a small touchscreen 122, or small sized textual elements, the user performs the tap gesture 340*a* slightly higher within the keyboard area 240, the insertion cursor 184 may become relocated to an unintended location (e.g., between textual elements "Dear" and "Fred"). After performing the block 344, the routine 300 loops back to the block 304, where it may receive an additional user input gesture.

Recognition Error Correction Gesture Processing

Figure 6A:
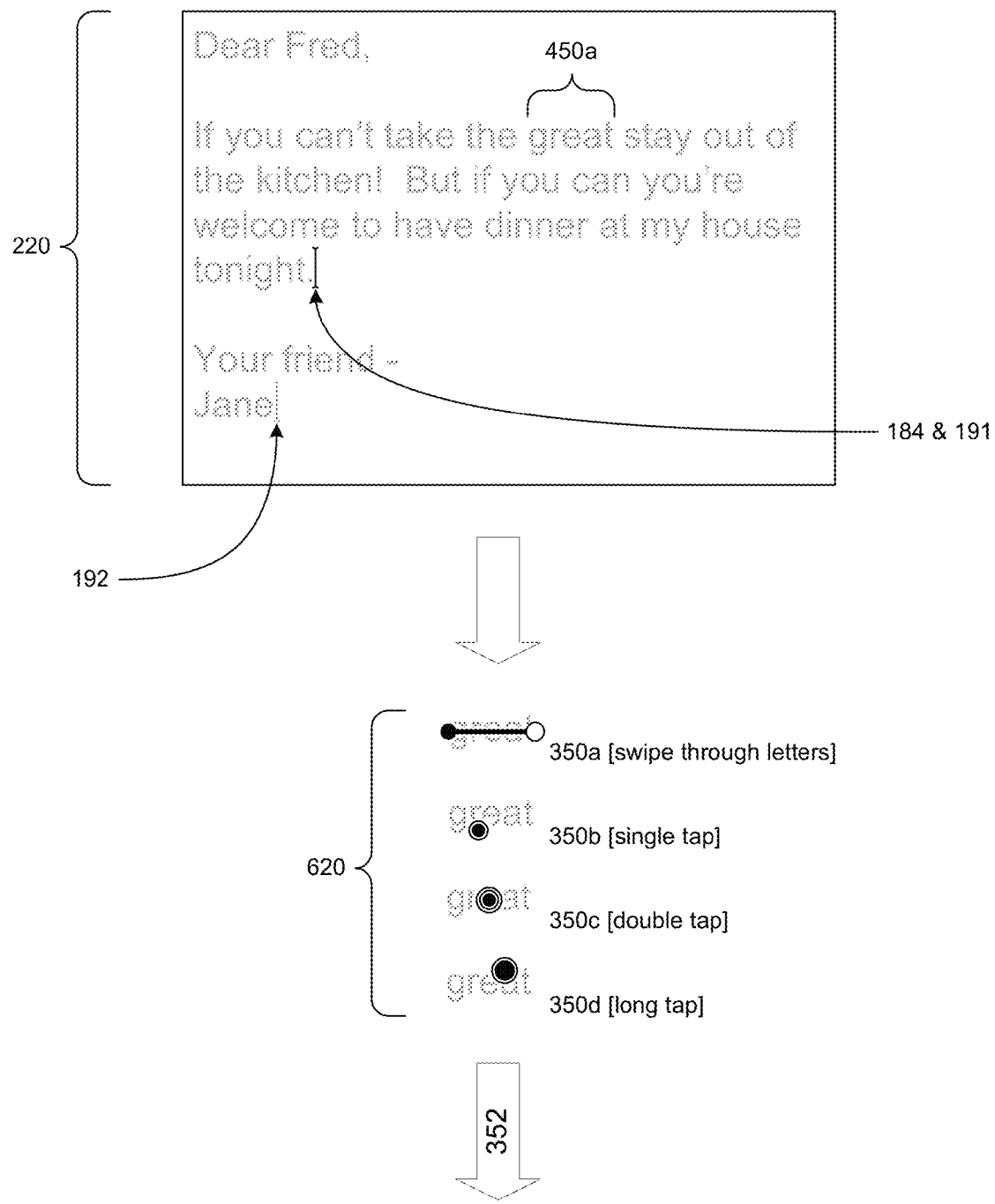
FIG. 6A-B illustrate various recognition error correction gestures that a smart phone or other device may recognize in order to receive an indication of an erroneously recognized textual object, to receive a selection of an alternative textual object, and to replace the erroneously recognized textual object with the selected alternative textual object.
Figure 6B:
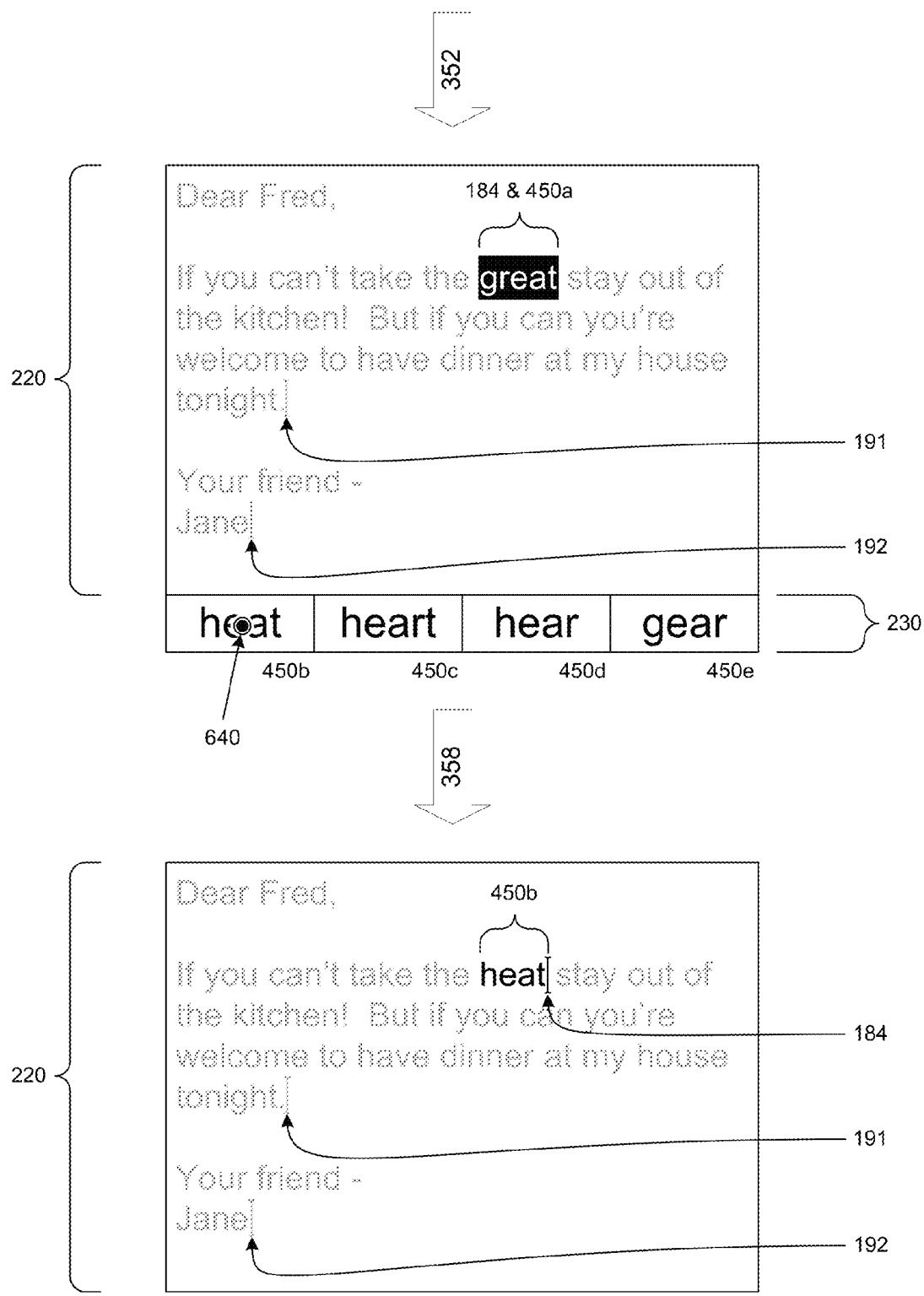

FIGS. 6A-B illustrate a number of recognition error correction gestures 620 that a user may use on the smart phone or other device to correct a recognition error. In various embodiments, the user may perform any of the gestures 620 on the textual element "great" 450*a* illustrated in the text accumulation area 220 to change the word. The routine 300 may have interpreted an ambiguous gesture 310*c* as the word "great" 450*a* and inserted the word as a new textual element in the text accumulation area 220. The area 220 also illustrates three cursor locations, one of which is the insertion cursor 184 as well as the location of the first active cursor 191, and the other of which is the location of the second active cursor 192.

In various embodiments, a recognition error correction gesture 620 may be a swipe 350*a* through one or more letters of textual element 450*a*. Alternately, the error correction gesture may be a single-tap gesture 350*b*, a double-tap gesture 350*c*, or a long-tap gesture 350*d*, each performed proximate to the erroneously recognized textual element 450*a* that the user desires to correct. Referring back to FIG. 3, if the routine 300 determines at the block 306 that a recognition error correction gesture 350 was received, it continues to a block 352, where it determines which textual object the user desires to correct. For example, in FIG. 6A, the user indicates the textual element "great" 450*a* by performing one of the gestures 620 proximate to that textual element 450*a*.

The routine 300 proceeds from the block 352 to a block 354, where it receives a selection of an alternately interpreted textual object. It then proceeds from the block 354 to a block 356, where it replaces the indicated textual object with the selected alternative textual object. In some aspects, the user merely confirms a proposed alternative selection. The routine 300 then proceeds to a block 358, where it sets the insertion cursor 184 to a location after the replaced textual object. Since the replacement textual object may differ in length from the replaced object, this replacement action may result in a net change in the length of the text, and, as in other cases where text is inserted or deleted, the routine 300 proceeds to step 359 to determine whether any existing active cursors are affected by this change, and if so, are adjusted accordingly so that they continue to refer to the same relative locations within the existing text. The routine 300 then loops back to the block 304.

FIG. 6B illustrates further detail of the recognition error correction process. The selection of a word to replace the incorrect word may be performed with a single-tap gesture 640 on one of the items in the menu 230. The menu items present alternate interpretations 450b, 450c, 450d, and 450e for the indicated textual object to be corrected. The lower portion of FIG. 6B illustrates the selected alternative textual object 450b replacing the erroneously recognized textual object 450a in the text accumulation area 220, and the insertion cursor 184 being set to the location after the replacement textual object 450b.

During the recognition error correction process (e.g., including the blocks 352-358), the active cursors are not relocated with respect to adjacent textual objects. However, if the accumulated text is stored in, for example, an array data structure, and if the size of the array changes as a result of the replacement 354 (e.g., if the selected alternate interpretation takes up a different amount of space in the array), then all of the contents of the text buffer array after the indicated textual object will need to be moved within the array in order to properly complete the recognition error correction process. Such changes create the need to adjust any references to the array contents, such as an active cursor, which as discussed is performed in block 359.

Active Cursor Recall Gesture Processing

Figure 7:
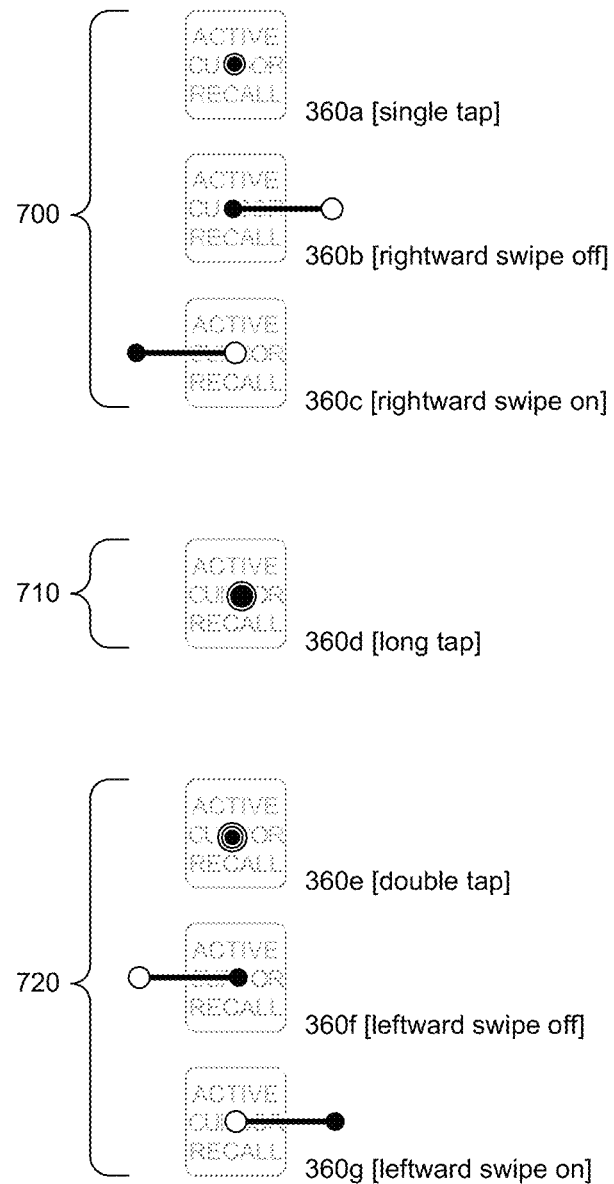
FIG. 7 illustrates various active cursor recall gestures that a smart phone or other device may recognize to efficiently relocate the insertion cursor to an active cursor.

FIG. 7 illustrates various exemplary active cursor recall gestures 360a-360g that a smart phone or other device may be programmed to recognize to efficiently relocate the insertion cursor 184 to an active cursor location. Although the examples shown in FIG. 7 utilize the exemplary active cursor recall control key 242, recall that as previously mentioned, the insertion cursor relocation action may consist of any of a variety of user input actions, including gestures on the touchscreen keyboard, gestures on the text display area, spoken commands, etc. For example, with the smart phone 200 in the state shown in FIG. 2A, the user may perform the single-tap gesture 360a to efficiently relocate the insertion cursor 184 to one of the two different active cursor locations 191 or 192.

In many cases, the user is able to select an active cursor recall control more reliably than performing an explicit relocation gesture, e.g., because the active cursor recall control key 242 is relatively easy to press. The recall of an active cursor location may also reference a text location not currently visible on the text display, resulting in the text being automatically scrolled so that the recalled location is shown on the display. Therefore, the active cursor recalling functionality can facilitate and speed up the process of composing and correcting text.

Referring back to FIG. 3, after the user performs one of the active cursor recalling gestures 360, such as the single-tap gesture 360a, the routine optionally proceeds to a block 362, where it determines whether one of the active cursors 190 matches the insertion cursor 184. (Note that some components or steps are illustrated by dashed lines, such as the blocks 342 and 362, in order to emphasize them as being optional.) Proceeding to a block 364, an active cursor that is selected may be dependent upon which active cursor recall gesture 360 the system 100 received, how many active cursors exist, and/or the relative position of the insertion cursor 184 to the active cursors 190, as well as other factors. In a preferred embodiment, the active cursor that is selected will not match the insertion cursor.

In some embodiments, the system 100 will sort the group of active cursors 190 according to some criteria prior to the selection. For example, the group of active cursors 190 may be sorted by the positional order in which the active cursors appear in the text accumulator, by the temporal order in which the active cursors were created, by the temporal order in which the active cursors were last modified (i.e., "set" in blocks 322, or 330), or by the temporal order in which the active cursors were previously recalled. The sorting may be performed forward or backward in various embodiments, and in response to various active cursor recall gestures. In one embodiment, only one active cursor is implemented (e.g., for simplicity of the user interface design), which the routine 300 automatically selects in the block 364.

In some aspects, a first group of active cursor recall gestures 700 illustrate gestures 360a-360c that may be used to recall the active cursor that next positionally follows the insertion cursor 184. In FIG. 2A, the active cursor 191 positionally follows the insertion cursor. FIG. 2B illustrates the 1st active cursor after being recalled in this scenario. In some embodiments, when no active cursor positionally follows the insertion cursor, the active cursor appearing positionally first in the document may be selected.

In some aspects, a second group 710 of active cursor recall gestures may be used, for example, to recall a 1st 191 (or, alternately, a last 193) active cursor. When only two active cursors exist as is illustrated in FIG. 2A, the last active cursor is the 2nd active cursor 192.

In some aspects, a third group 720 of active cursor recall gestures may be used, for example, to recall the active cursor that next positionally precedes the insertion cursor. In some embodiments, when no active cursor positionally precedes the insertion cursor, the active cursor appearing positionally last in the document may be selected. For example, in FIG. 2A, the system 100 may select the second active cursor 192 after the user performs one of the gestures 720 because there are no active cursors positionally preceding the insertion cursor 184.

Figure 8:
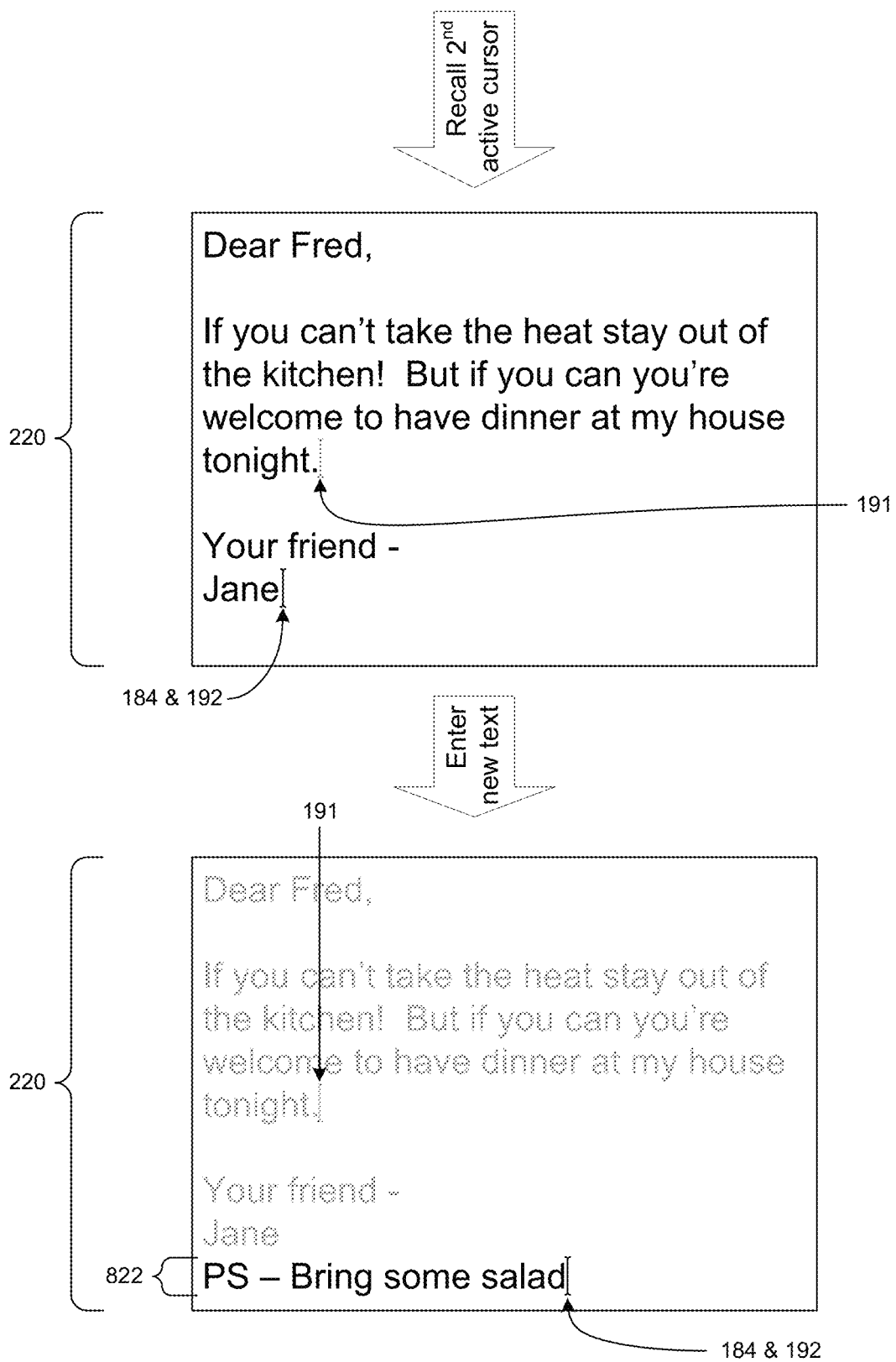
FIG. 8 illustrates the smart phone of FIG. 2A recalling a second active cursor, and subsequently inserting new text at that location.

FIG. 8 illustrates the smart phone of FIG. 2A recalling the 2nd active cursor 192, and subsequently inserting new text 822 at that location. The inserted new text 822 illustrates another scenario in which recalling an active cursor can be useful to avoid problematic explicit relocation of the insertion cursor 184. A person with ordinary skill in the art will understand that many other scenarios exist in which recalling various active cursors can be useful, including ones where text exists after the last active cursor.

Alternate Embodiments

In some embodiments, the system 100 maintains the active cursors 190 in one or more stack data structures, such as in order to implement a "last in, first out" order of active cursor recalling. A newly created active cursor could then, for example, be pushed onto the stack, and the most recently created active cursor that has not yet been recalled could be selected for recalling by popping it from the stack.

In some embodiments, the system 100 maintains the active cursors 190 in one or more queue data structures, such as in order to implement a "first in, first out" order of active cursor recalling. A newly created active cursor could then be added into the queue in order to save it, and the oldest created active cursor that has not yet been recalled could be selected for recalling by simply performing a de-queue operation.

In some embodiments, only one active cursor (e.g., the active cursor 191) may exist, so that it can be used to manually recall the cursor position after performing, for example, a non-sequential correction of one or more textual recognition errors.

In some embodiments, no more than two active cursors (e.g., the 1st active cursor 191 and the 2nd active cursor 192) may exist. This allows the user to non-sequentially insert text at two different locations, and "bounce" between the two locations as needed, without needing to perform an explicit cursor relocation gesture.

In other embodiments, more than two active cursors, e.g., the N active cursors represented by the 1st cursor 191, the 2nd active cursor 192, and any additional active cursors, such as the Nth active cursor 193 may exist. In embodiments where multiple active cursors exist, the input action recognition component 166 may be capable of recognizing as many as N distinct active cursor recalling commands that the user may utilize in order to distinguish where the user desires to relocate the insertion cursor 184.

In some embodiments, the system 100 may utilize utterances (e.g., received by the microphone 132) for performing any one or more of textual inputs, recognition error corrections, editing or explicit relocations, and active cursor recalling. For example, the user may speak "next active cursor" or simply "recall cursor" to recall an active cursor. In some embodiments, the utterances may supplement or even completely replace the touch-based gesture-based inputs disclosed herein, either in whole or in part. In some embodiments, an active cursor recall command may be implemented by the selection of a menu item.

Although the illustrated English language embodiment inserts new text or other content to the right of the insertion cursor 184, a person having ordinary skill in the art will understand that the disclosed technology can be modified or adapted in a variety of ways, such as to accommodate different languages. For example, alternative embodiments may insert new textual elements (e.g., 414, 432) to the left of the insertion cursor 184 (e.g., in an Arabic or Hebrew language embodiment), or even below the insertion cursor 184 (e.g., in a traditional Chinese or Japanese language embodiment), and maintain the insertion cursor 184 and any active cursors 190 in a manner that is consistent with the different direction of text insertion.

In some embodiments, the system 100 displays active cursors 190 differently than the insertion cursor 184. For example, an active cursor may be displayed on the touchscreen 122 with different color, dimensions, line thickness, or another appearance characteristic than the insertion cursor 184. In other embodiments, the system 100 displays either the insertion cursor 184 or active cursors 190, but not both types of cursor at the same time. In other embodiments, the system 100 displays only the insertion cursor 184, and the location of an active cursor is explicitly revealed when the insertion cursor is relocated to the location of the active cursor.

In some embodiments, the active cursors 190 may refer to textual objects that are located in different text editing environments that may be implemented in, or used by, different features of the operating system 162 and/or applications 170. For example, a user may utilize an active cursor recalling gesture to switch from the "send message" application illustrated in FIG. 2 to a different application (e.g., "notes") in which the user has entered textual objects that are referred to by one or more active cursors. The selection of an active cursor (including any related sorting) may be based on the environment to which the active cursor refers.

In some embodiments, where a split screen display feature can be effectively utilized, such as on a tablet computer having a sufficiently large touchscreen (or a desktop computer), one of the split screens can show a region around the insertion cursor, and another one or more of the split screens can show a region around one or more active cursors (e.g., a most recent active cursor). In one embodiment, the ordering of the split screens may be automatically maintained according to the relative order of the insertion cursors and the active cursors related to each split screen. For example, a first split screen showing an active cursor preceding an insertion cursor that is shown in a second split screen may be automatically ordered first (e.g., on the top, or left side).

In some embodiments utilizing the active cursor recall key 242, when no active cursor is selectable (e.g., when no active cursor exists, or when no active cursor exists that does not match the insertion cursor), the system 100 may "gray out" the display of the active cursor recall key 242, or may not display it at all. Some embodiments may utilize user input methods disclosed in U.S. Patent Application No. 61/625,070, filed on May 3, 2012, entitled "LOW-ATTENTION GESTURAL USER INTERFACE, the content of which is herein incorporated by reference in its entirety.

In some embodiments, the routine 300 may utilize the same gesture for the error correction gesture as it does for the explicit cursor relocation gesture, although in other embodiments, different gestures may be used. Alternately, the system 100 may distinguish between a recognition error correction gesture and an explicit cursor relocation gesture based on its location (e.g., if the gesture is performed on or across a textual object, the system 100 may interpret it as a recognition error correction gesture, and if the gesture is performed in between two textual objects, the system 100 may interpret it as a explicit relocation gesture).

In alternate embodiments, the routine 300 may first process a gesture simultaneously as an explicit cursor relocation gesture and a recognition error correction gesture. For example, after performing explicit insertion cursor relocation, the routine could automatically consider a textual object proximate to the relocated insertion cursor for which correction is desired. If the user does not select an alternatively recognizable textual object, the recognition error correction process could be aborted. This may allow the system 100 to recognize additional gestures (e.g., for performing editing commands, such as cut, copy, or paste). It may also facilitate implementation of the disclosed technology as a third-party application on certain operating systems.

In some embodiments, in addition to or instead of the optional steps 342 and 362, the user may perform an explicit command (e.g., gesture) to delete an active cursor (e.g., when the user feels that the text is "final" and will not return to that location).

In some embodiments, an active cursor recall gesture may be a swiping gesture across two or more predetermined keys on the keyboard. For example, a gesture from the "a" key through the "c" key to the "r" key, to signify "active cursor recall".

Although not required, aspects and embodiments of the disclosed technology utilize the general context of computer-executable instructions stored on a non-transitory computer readable media such as a memory, a DVD, a CD ROM, flash circuitry, a hard drive, etc., such as routines executed by a general-purpose computer, e.g., a server or personal computer. Those skilled in the relevant art will appreciate that the disclosed technology can be practiced with computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The disclosed technology can be embodied in a special purpose computer or data processor that is specifically programmed, configured or constructed to perform one or more of the computer-executable instructions explained in detail herein. Indeed, the term "computer", as used generally herein, refers to any of the above devices, as well as any data processor or any device capable of communicating with a network, including consumer electronic goods such as game devices, cameras, or other electronic devices having a processor and other components, e.g., network communication circuitry.

The disclosed technology can also be practiced in distributed computing environments, where tasks or modules are performed by remote processing devices, which are linked through a communications network such as a Local Area Network, Wide Area Network or the Internet. In a distributed computing environment, sub-routines may be located in both local and remote memory storage devices.

In general, the detailed description of embodiments of the disclosed technology is not intended to be exhaustive or to limit the disclosed technology to the precise form disclosed above. While specific embodiments of, and examples for, the disclosed technology are described above for illustrative purposes, various equivalent modifications are possible within the scope of the disclosed technology, as those skilled in the relevant art will recognize. For example, while processes or blocks are presented in a given order, alternative embodiments may perform routines having steps, or employ systems having blocks, in a different order; and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

These and other changes can be made to the disclosed technology in light of the above Detailed Description. While the above description details certain embodiments of the disclosed technology and describes the best mode contemplated, no matter how detailed the above appears in text, the disclosed technology can be practiced in many ways. Details of the disclosed technology may vary considerably in its implementation details while still being encompassed by the disclosed technology disclosed herein. For example, although the described embodiment illustrate text object being inserted into a content accumulator, it will be appreciated that the content could be other items such as graphics, video clips, audio clips or the like. The content accumulator may store content for a document, text message, e-mail, video, song or other media that is created via a content adding and entering process.

As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific embodiments disclosed in the specification unless the above Detailed Description section explicitly defines such terms. Accordingly, the actual scope of the disclosed technology encompasses not only the disclosed embodiments, but also all equivalent ways of practicing or implementing the disclosed technology.

I claim:

1. A non-transitory computer-readable medium containing instructions that cause a processor to perform a method for facilitating content entry into a content accumulator at a location of an insertion cursor by:
    storing one or more active cursor positions,
        wherein each active cursor position marks a location where a user previously ended content entry;
    in response to content entry by a user at a first location where the user did not previously end content entry, creating a new active cursor position marking a new location at the end of the entered user content;
    in response to content entry by a user at a second location where the user previously ended content entry, relocating a stored active cursor position from marking the second location to marking an updated location at the end of the entered user content;
    in response to receiving an indication to move the insertion cursor to a different location in the content accumulator, moving the insertion cursor to the indicated location without creating or relocating an active cursor;
    in response to receiving a command to replace a content element near the insertion cursor with an alternate content element, modifying the content accumulator accordingly without creating or relocating an active cursor;
    in response to receiving a command to relocate the insertion cursor to a stored location of a previously created active cursor, moving the insertion cursor to a location of a previously created active cursor; and
    in response to receiving user input, delete a stored active cursor, such that the number of stored active cursors is decreased.

2. The non-transitory computer-readable medium of claim 1, wherein the instructions cause the processor to:
    maintain the location of the insertion cursor at the end of the replaced content element following a command to replace a content element near the insertion cursor with an alternate content element; and
    modify any active cursor marking a location that is affected by a modification of the content accumulator.

3. The non-transitory computer-readable medium of claim 1, wherein only two active cursors are stored in a memory and the instructions cause the processor to return the insertion cursor to a location of a previously created active cursor by alternately moving the location of the insertion cursor to the location of one of the two previously created active cursors.

4. The non-transitory computer-readable medium of claim 1, further comprising instructions that are executable by the processor to:
    store multiple active cursors in one or more lists;
    sort the active cursors in one or more of the lists; and
    move the insertion cursor to the location of an active cursor according to the order in which the active cursors are stored.

5. The non-transitory computer-readable medium of claim 1, further comprising instructions that are executable by the processor to:
    indicate, in a visual representation of the content in the content accumulator, the locations referenced by one or more of the stored active cursors on a display screen, wherein an indicated location referenced by a stored active cursor is separate from the location of the insertion cursor.

6. The non-transitory computer-readable medium of claim 1, further comprising instructions that are executable by the processor to:

distinguish two or more environments, wherein content elements are entered in one of said environments when a content accumulator belonging to that environment is selected as the current content accumulator;

for each environment, create one or more active cursors associated with the content accumulator of that environment; and interpret at least one of said commands to relocate the insertion cursor as a command to move the cursor to one of said one or more previously created active cursors in an environment other than the current environment.

7. The non-transitory computer-readable medium of claim 6, further comprising instructions that are executable by the processor to:

for each environment, include the most recent position of the text insertion cursor as one of said one or more active cursors; and interpret at least one of said commands to relocate the insertion cursor as a command to move the cursor to the recorded location corresponding to said most recent position of the text insertion cursor in an environment other than the current environment.

8. The non-transitory computer-readable medium of claim 7, further comprising instructions that are executable by the processor to:

receive a command to simultaneously display two or more distinct regions of one or more content accumulators, wherein at least one of said regions is contained in an environment other than the current environment; and automatically select at least one of said two or more distinct regions as a region containing said most recent position of the text insertion cursor in said other environment.

9. The non-transitory computer-readable medium of claim 1, further comprising instructions that are executable by the processor to:

receive a command to simultaneously display two or more distinct regions of the content accumulator; and automatically select at least one of said two or more distinct regions as a region containing one of said active cursors.

10. A system for facilitating the entry of content into a content accumulator at a location of an insertion cursor, comprising:

a display screen;

a memory storing computer-executable instructions;

processor electronics that are configured to execute the instructions to:

store one or more active cursor positions, wherein each active cursor position marks a location where a user previously ended content entry;

in response to content entry by a user at a location marked by an active cursor, relocate the active cursor position to mark an updated location at the end of the entered user content;

in response to receiving an indication to move the insertion cursor to a different location in the content accumulator, relocate the insertion cursor to the indicated location without creating or relocating an active cursor;

in response to content entry by a user at a location not marked by an active cursor, create an active cursor position that marks a new location at the end of the entered user content;

in response to receiving a command to replace a content element near the insertion cursor with an alternate content element, modify the content accumulator accordingly without creating or relocating an active cursor;

in response to receiving a command to relocate the insertion cursor to a stored location of a previously created active cursor, move the insertion cursor to a location of a previously created active cursor; and in response to receiving user input, delete a stored active cursor, such that the number of stored active cursors is decreased.

11. The system of claim 10, wherein the instructions are executable by the processor electronics to:

maintain the location of the insertion cursor at the end of the replaced content element following a command to replace a content element near the insertion cursor with an alternate content element; and modify any active cursor marking a location that is affected by a modification of the content accumulator.

12. The system of claim 10, further comprising instructions that are executable by the processor electronics to:

store two active cursors; and receive a command to alternately move the insertion cursor to a location of each of the stored two active cursors.

13. The system of claim 10, further comprising instructions that are executable by the processor electronics to:

store multiple active cursors in one or more lists;

sort the stored active cursors in one or more of the lists; and move the insertion cursor to the location of an active cursor according to the order in which the active cursors are stored.

14. The system of claim 10, further comprising instructions that are executable by the processor electronics to:

indicate, in a visual representation of the content in the content accumulator, the locations referenced by one or more of the stored active cursors on a display screen, wherein an indicated location referenced by a stored active cursor is separate from the location of the insertion cursor.

15. The system of claim 10, further comprising instructions that are executable by the processor electronics to:

distinguish two or more environments, wherein content elements are entered in one of said environments when a content accumulator belonging to that environment is selected as the current content accumulator;

for each environment, create one or more active cursors associated with the content accumulator of that environment; and interpret at least one of said commands to relocate the insertion cursor as a command to move the cursor to one of said one or more previously created active cursors in an environment other than the current environment.

16. The system of claim 15, further comprising instructions that are executable by the processor electronics to:

for each environment, include the most recent position of the text insertion cursor as one of said one or more active cursors; and interpret at least one of said commands to relocate the insertion cursor as a command to move the cursor to the recorded location corresponding to said most recent position of the text insertion cursor in an environment other than the current environment.

17. The system of claim 16, further comprising instructions that are executable by the processor electronics to:

receive a command to simultaneously display two or more distinct regions of one or more content accumulators, wherein at least one of said regions is contained in an environment other than the current environment; and automatically selecting at least one of said two or more distinct regions as a region containing said most recent position of the text insertion cursor in said other environment.

18. The system of claim 10, further comprising instructions that are executable by the processor electronics to:
receive a command to simultaneously display two or more distinct regions of the content accumulator; and
automatically select at least one of said two or more distinct regions as a region containing one of said active cursors.

19. A method for facilitating text entry in a mobile device having a processor, a memory, and a display configured to display an insertion cursor at a first location following previously entered text, the method comprising:
recording a recallable active cursor position at the first location;
receiving user input, such that the insertion cursor is at a second location following the user input;
wherein the user input includes text entry or a command to replace a word within the previously entered text;
after the user input, receiving an indication to move the insertion cursor to a third location distinct from the second location;
if the user input included text entry, then:
recording a recallable active cursor position at the second location; and
removing the recorded recallable cursor position from the first location, such that the recallable active cursor position marks the second location instead of the first location;
otherwise, when the user input was a command to replace a word within the previously entered text, then:
without additional user input, moving the insertion cursor to the third location without recording a recallable active cursor position at the second location or relocating the recallable active cursor position to the second location;
receiving a cursor recall command to relocate the insertion cursor to a recorded active cursor position; and
in response to the cursor recall command, relocating the insertion cursor to the recorded recallable active cursor position.

20. The method of claim 19, wherein the cursor recall command is distinct from a command to undo text entry.

* * * * *